US012638550B2

(12) United States Patent
Roames et al.

(10) Patent No.: US 12,638,550 B2
(45) Date of Patent: May 26, 2026

(54) RADIO FREQUENCY SIGNAL GENERATOR

(71) Applicants: Jennifer K. Roames, Fredericksburg, VA (US); Sara P. Callison, King George, VA (US); Trevor W. Martineau, Fredericksburg, VA (US); William C. Lloyd, Fredericksburg, VA (US)

(72) Inventors: Jennifer K. Roames, Fredericksburg, VA (US); Sara P. Callison, King George, VA (US); Trevor W. Martineau, Fredericksburg, VA (US); William C. Lloyd, Fredericksburg, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 285 days.

(21) Appl. No.: 18/459,071

(22) Filed: Aug. 31, 2023

(65) Prior Publication Data

US 2025/0076462 A1 Mar. 6, 2025

(51) Int. Cl.
*G01S 7/40* (2006.01)
*G06F 16/25* (2019.01)

(52) U.S. Cl.
CPC ............... *G01S 7/406* (2021.05); *G01S 7/40* (2013.01); *G06F 16/254* (2019.01)

(58) Field of Classification Search
CPC . G01S 7/021; G01S 7/40; G01S 7/406; G01S 7/4095; G06F 16/254
See application file for complete search history.

(56) References Cited

U.S. PATENT DOCUMENTS

2020/0072943 A1* 3/2020 Laur ........................ G01S 7/411
2022/0053337 A1* 2/2022 Yang ..................... H04W 24/08

* cited by examiner

*Primary Examiner* — Timothy A Brainard
(74) *Attorney, Agent, or Firm* — Edward M. Bushard; Gerhard W. Thielman

(57) ABSTRACT

A computer-implemented method for generating a radio frequency (FR) waveform scenario file format. The method includes acquiring raw data from at least one source, extracting a radar data from the raw data, parsing a radar profile from the radar data, storing the radar profile, and converting the radar profile to a radio frequency (RF) waveform scenario file format. The method may also include using known radar profiles to provide an approximation of a complete radar profile when the raw data is incomplete.

10 Claims, 8 Drawing Sheets

21    Remove redundant data from the radar profile

23    Remove unnecessary data

25    Rename the key-value pairs to common key-value pair names

27    Convert units to standard units

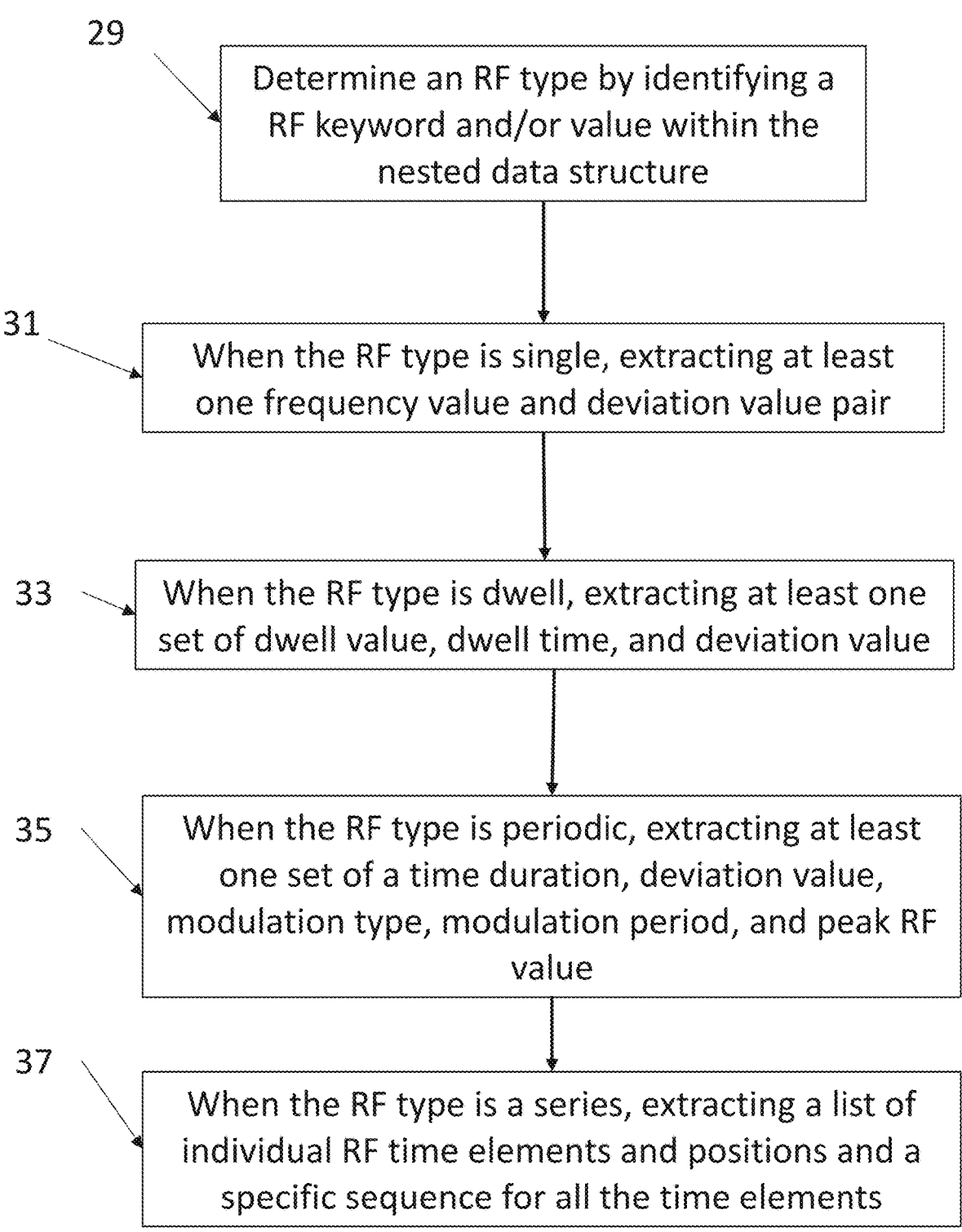

29

Determine an RF type by identifying a RF keyword and/or value within the nested data structure

31

When the RF type is single, extracting at least one frequency value and deviation value pair

33

When the RF type is dwell, extracting at least one set of dwell value, dwell time, and deviation value

35

When the RF type is periodic, extracting at least one set of a time duration, deviation value, modulation type, modulation period, and peak RF value

37

When the RF type is a series, extracting a list of individual RF time elements and positions and a specific sequence for all the time elements

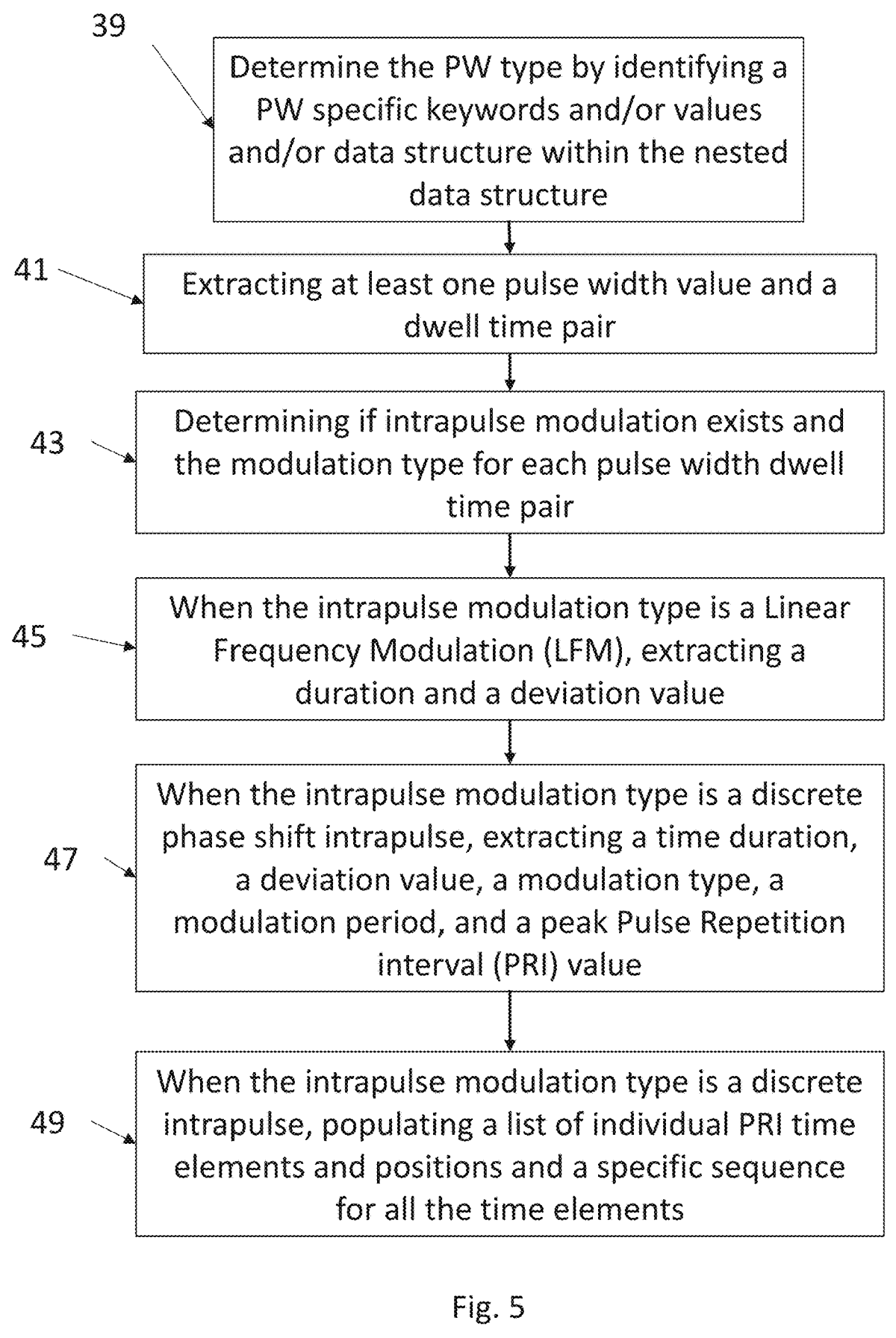

Determine the PW type by identifying a PW specific keywords and/or values and/or data structure within the nested data structure

41

Extracting at least one pulse width value and a dwell time pair

43

Determining if intrapulse modulation exists and the modulation type for each pulse width dwell time pair

45

When the intrapulse modulation type is a Linear Frequency Modulation (LFM), extracting a duration and a deviation value

47

When the intrapulse modulation type is a discrete phase shift intrapulse, extracting a time duration, a deviation value, a modulation type, a modulation period, and a peak Pulse Repetition interval (PRI) value

49

When the intrapulse modulation type is a discrete intrapulse, populating a list of individual PRI time elements and positions and a specific sequence for all the time elements

Fig. 5

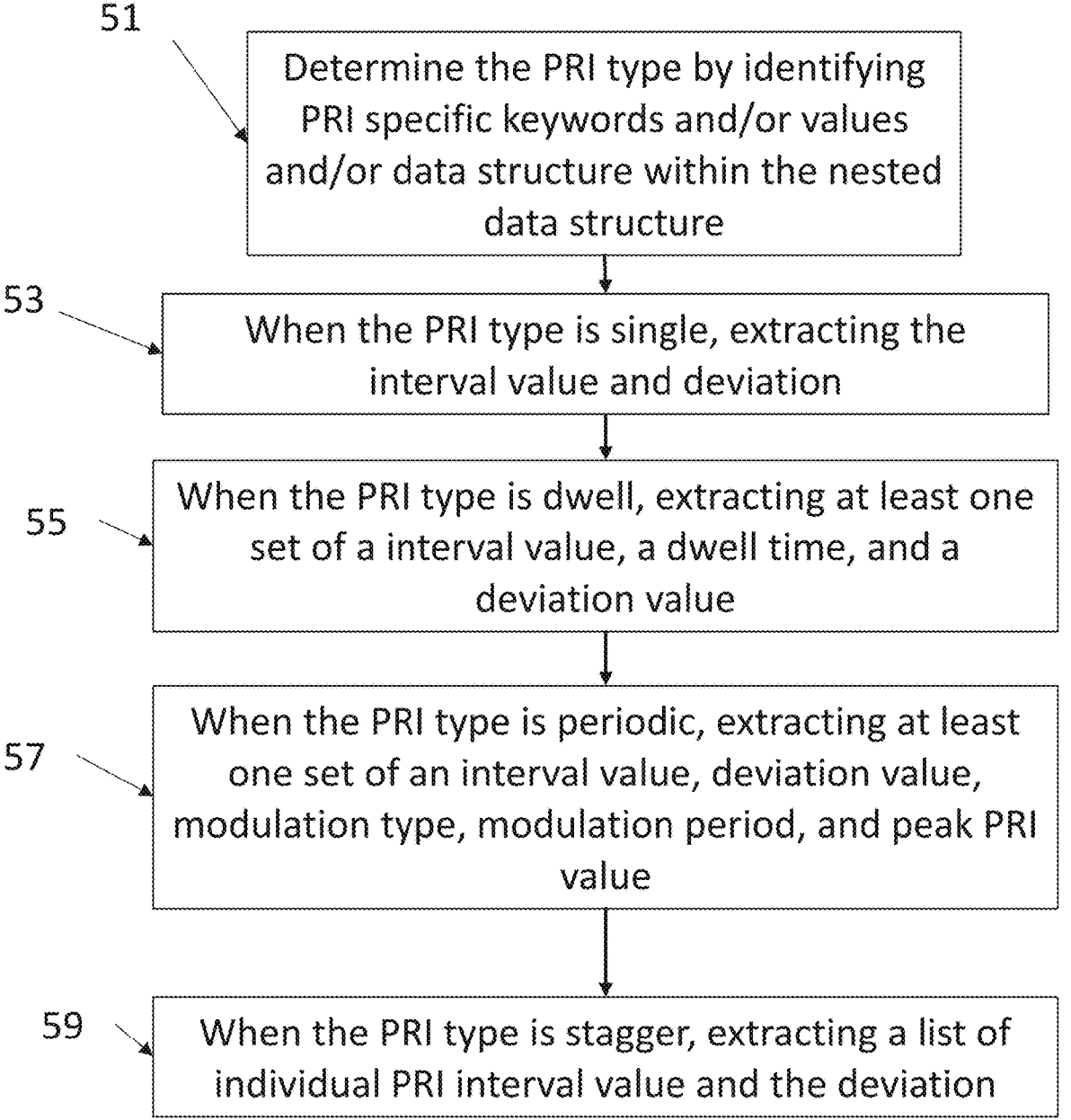

51 Determine the PRI type by identifying PRI specific keywords and/or values and/or data structure within the nested data structure 53 When the PRI type is single, extracting the interval value and deviation 55 When the PRI type is dwell, extracting at least one set of a interval value, a dwell time, and a deviation value 57 When the PRI type is periodic, extracting at least one set of an interval value, deviation value, modulation type, modulation period, and peak PRI value 59 When the PRI type is stagger, extracting a list of individual PRI interval value and the deviation

Fig. 6

61 — Identify a desired radar profile

63 — Extract the desired radar profile from the radar profile database

65 — When the desired radar profile is incomplete referencing a known radar profile database 67 — Approximating a complete radar profile from the radar data and the known radar profile database

RADIO FREQUENCY SIGNAL GENERATOR

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to Radio Frequency signal generators. In particular, a method for generating a signal using raw data from a variety of sources.

Simulations of radar waveforms are created from intelligence data and programmed into an RF signal generator to be used for testing sensor systems in a lab or field environment. Currently, radar data is obtained from intelligence sources and used to create RF waveforms by manually entering the data into a user interface (UI) of a signal generator to populate data fields for purposes of testing systems that detect and measure RF signals. The intelligence sources reside in various databases or on websites hosted by the intelligence organization responsible for its dissemination.

The RF signal generator is generally a stand-alone piece of test equipment that has a UI for creating RF waveforms. The waveforms require single input entry of necessary fields such as radio frequency (RF), pulse width (PW), pulse repetition interval (PRI), and modulation characteristics (see FIG. 8). Each of these fields has additional sub-fields that fully define the waveform. For example, a time duration and a modulation type define a PRI. Additionally, the PRI modulation can be sinusoidal which requires additional fields to define deviation and period of the sine function. Another PRI modulation type is staggered which requires a list of individual PRI time elements and positions and a specific sequence they need to be arranged in. There are many similar sub-fields for defining the radio frequency and pulse duration fields. There can be thousands of individual data points to create one RF signal in a signal generator making this labor intensive, time-consuming, prone to input error, and the data may be incomplete.

A limitation to this method is the varying formats of different intelligence sources that create an issue for standardizing data formats for ease of use. A disadvantage is the manual entry of each data field into the signal generator UI which is a time-intensive process. This manual entry requires each value from an intelligence source to be entered into the formatted signal generator UI one field at a time. Another disadvantage is that the intelligence source data and the signal generator interface are not on the same computer (the signal generator interface is on a non-networked computer and the intelligence data resides on classified network computers). Another disadvantage is that the intelligence source data may be incomplete.

SUMMARY

The present application discloses a computer-implemented method that includes acquiring raw data from at least one source, extracting a radar data from the raw data, parsing a radar profile from the radar data, storing the radar profile, and converting the radar profile to a radio frequency (RF) waveform scenario file format. The raw data sources source may include at least one of a webpage, a table, a portable document format (PDF), a text file, a database, and an image.

In further embodiments, extracting a radar profile further includes identifying a plurality of key-value pairs that define the radar profile in the at least one source, extracting the key-value pair, determining the relationship between each of the key-value pairs, and extracting the key-value pairs into a nested data structure. The key-value pairs include at least one radio frequency waveform parameter, such as radio frequency (RF), pulse width (PW), pulse repetition interval (PRI), and modulation characteristic (MC).

In further embodiments, the method may include removing redundant data from the radar profile, removing any unnecessary data, renaming the key-value pairs to a common key-value pair names, and converting units to standard units. In further embodiments, the method may include transforming each of the key-value pairs to create the radio frequency (RF) waveform.

In further embodiments, transforming a radio frequency (RF) key-value pair may include determining an RF type by identifying a RF keyword and/or value within the nested data structure. The method may extract at least one frequency value and deviation value pair when the RF type is single. If the RF type is dwell, the method extracts at least one set of dwell value, dwell time, and deviation value. If the RF type is periodic the method extracts at least one set of a time duration, deviation value, modulation type, modulation period, and peak RF value. If the RF type is a series the method extracts a list of individual RF time elements and positions and a specific sequence for all the time elements.

In further embodiments, transforming a radio frequency (RF) key-value pair may include determining a Pulse Width (PW) key-value pair by identifying a PW specific keywords and/or values and/or data structure. The method may extract at least one pulse width value and a dwell time pair and determining if intrapulse modulation exists and the modulation type for each pulse width dwell time pair. If the intrapulse modulation type is a Linear Frequency Modulation (LFM), extracting a duration and a deviation value. If the intrapulse modulation type is a discrete phase shift intrapulse, extracting a time duration, a deviation value, a modulation type, a modulation period, and a peak Pulse Repetition interval (PRI) value. If the intrapulse modulation type is a discrete intrapulse, populating a list of individual PRI time elements and positions and a specific sequence for all the time elements.

In further embodiments, transforming a radio frequency (RF) key-value pair may include determining a Pulse Repetition Interval (PRI) key-value pair by identifying PRI specific keywords and/or values and/or data structure within the nested data structure. If the PRI type is single, extracting the interval value and deviation. If the PRI type is dwell, extracting at least one set of a interval value, a dwell time, and a deviation value. If the PRI type is periodic, extracting at least one set of an interval value, deviation value, modulation type, modulation period, and peak PRI value. If the PRI type is stagger, extracting a list of individual PRI interval value and the deviation. This may include maintaining the order from the raw data.

In a further embodiment, the method may include identifying a desired radar profile, extracting the desired radar profile from the radar profile database, when the desired radar profile is incomplete referencing a known radar profile database, approximating a complete radar profile from the radar data and the known radar profile database and verifying that the radar profile is complete.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIGS. 1-7 are a description of an exemplary embodiment; and

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, artisans of ordinary skill will readily recognize that devices of a less general purpose nature, such as hardwired devices, may also be used without departing from the scope and spirit of the inventive concepts disclosed herewith. General purpose machines include devices that execute instruction code.

Figure 1:
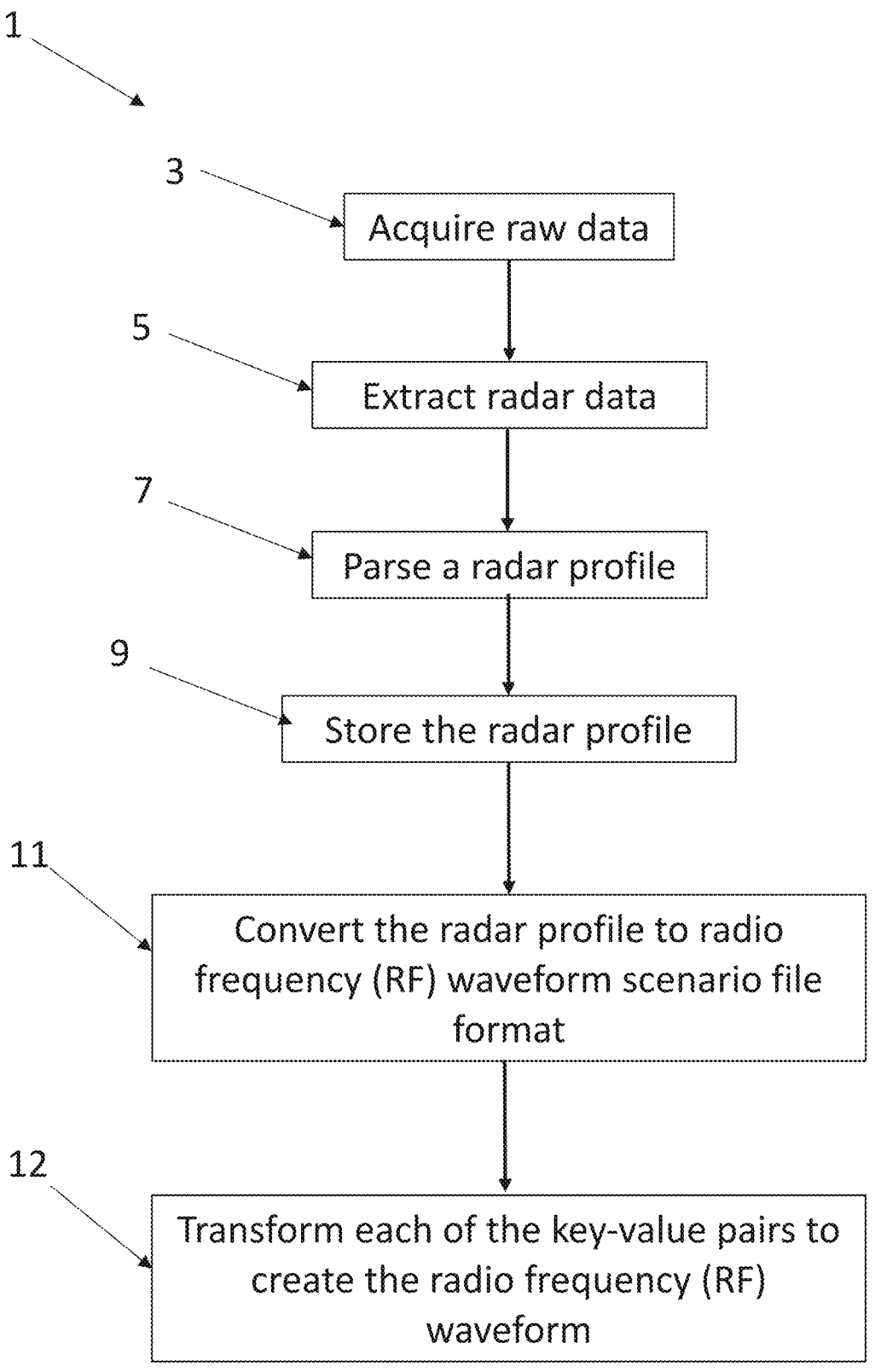

FIG. 1 shows an exemplary embodiment of the method 1. The computer implemented method begins in block 3 by acquiring raw data. In block 5, radar data is extracted from the raw data. In block 7, the method parses a radar profile from the radar data. In block 9, the radar profile is stored on a storage medium. In block 11, the radar profile is converted to a radio frequency (RF) waveform scenario file format. In block 12, the key-value pairs are transformed to create the radio frequency (FR) waveform.

Regarding block 3, the raw data may be acquired from a variety of formats including but not limited to webpages, portable document format (PDF), text files, spreadsheets, tables, database, and images.

Figure 2:
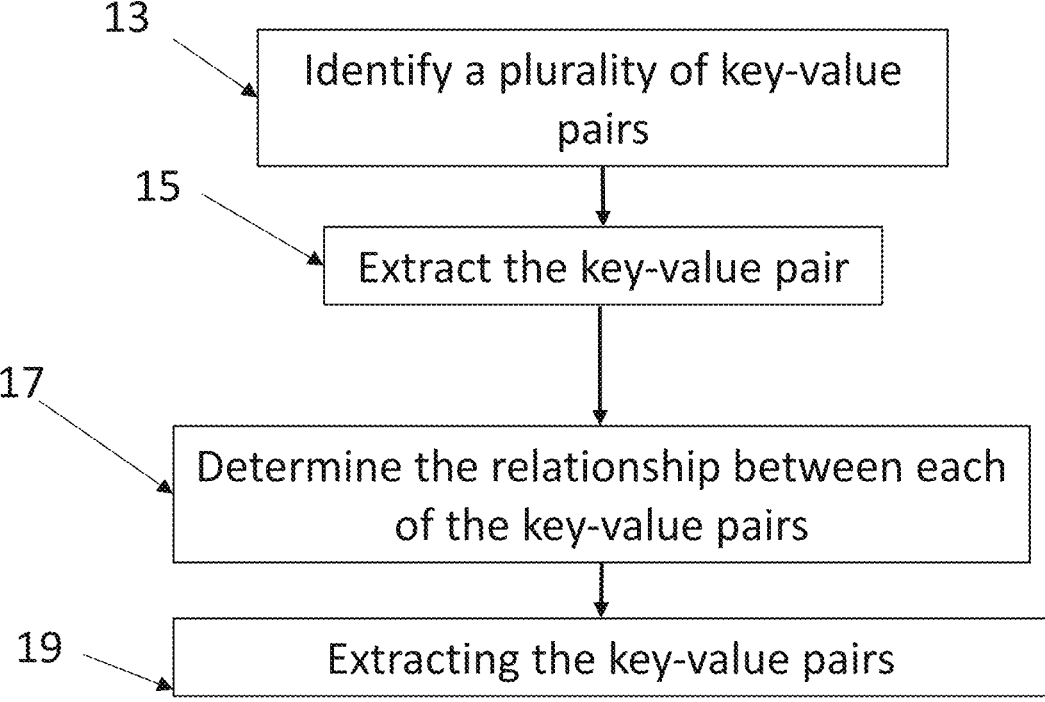

FIG. 2 expands on block 5 radar data extraction. The radar data may be extracted employing any combination of text parsers, natural language processing algorithms (NLP) and optical character recognition (OCR) algorithms the tool can extract. The radar data extraction further includes, block 13, in which, the method identifies a plurality of key-value pairs. The key-value pairs includes at least one radio frequency waveform parameter, such as radio frequency (RF), pulse width (PW), pulse repetition interval (PRI), and modulation characteristic (MC). In block 15, the method extracts the key-value pairs. At this point the key-value pairs can be managed in a variety of ways such as editing, creating, and deleting. In some embodiments, known radar profile databases may be used to fill in incomplete data. In block 17, the method determines the relationship between each of the key-value pairs. In block 19, the method may optionally extract the key-value pairs into a nested data structure.

Figure 3:
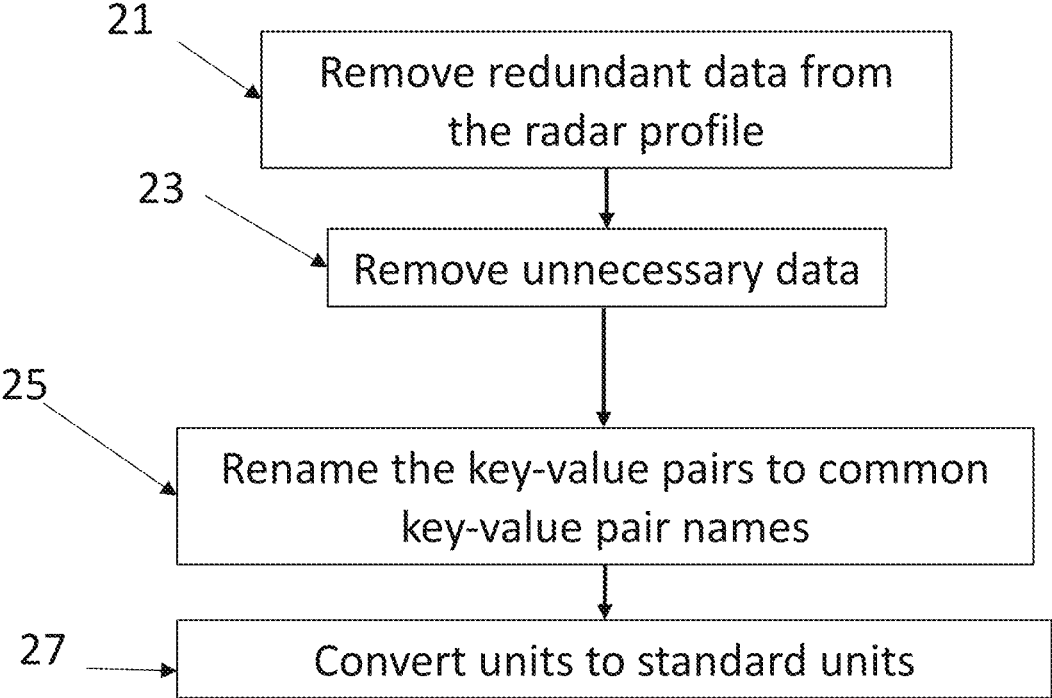

FIG. 3 expands on the method 1. In block 21 the method removes redundant data from the radar profile. In block 23, the method removes unnecessary data from the radar profile. In block 25, the key-value pairs are renamed to common key-value pair names. In block 27, the key-value pair units are converted to standard units.

FIG. 4 expands on block 12 with respect to the transformation of Radio Frequency (RF) type. In block 29, the method determines the RF type by identifying a RF keyword and/or value within the nested data structure. In block 31, when the RF type is single, extracting at least one frequency value and deviation value pair. In block 33, when the RF type is dwell, extracting at least one set of dwell value, dwell time, and deviation value. In block 35, when the RF type is periodic, extracting at least one set of a time duration, deviation value, modulation type, modulation period, and peak RF value. In block 37, when the RF type is a series, extracting a list of individual RF time elements and positions and a specific sequence for all the time elements.

FIG. 5 further expands on block 12 with respect to the transformation of Pulse Width (PW) type. In block 39, the method determines the PW type by identifying a PW specific keywords and/or values and/or data structure within the nested data structure. In block 41, extracting at least one pulse width value and a dwell time pair. In block 43, determining if intrapulse modulation exists and the modulation type for each pulse width dwell time pair. In block 45, the intrapulse modulation type is a Linear Frequency Modulation (LFM), extracting a duration and a deviation value. In block 47, the intrapulse modulation type is a discrete phase shift intrapulse, extracting a time duration, a deviation value, a modulation type, a modulation period, and a peak Pulse Repetition interval (PRI) value. In block 49, when the intrapulse modulation type is a discrete intrapulse, populating a list of individual PRI time elements and positions and a specific sequence for all the time elements.

FIG. 6 further expands on block 12 with respect to the transformation of the Pulse Repetition Interval (PRI). In block 51, the method determines the PRI type by identifying PRI specific keywords and/or values and/or data structure within the nested data structure. In block 53, when the PRI type is single, extracting the interval value and deviation. In block 55, when the PRI type is dwell, extracting at least one set of a interval value, a dwell time, and a deviation value. In block 57, when the PRI type is periodic, extracting at least one set of an interval value, deviation value, modulation type, modulation period, and peak PRI value. In block 59, when the PRI type is stagger, extracting a list of individual PRI interval value and the deviation.

Figure 7:
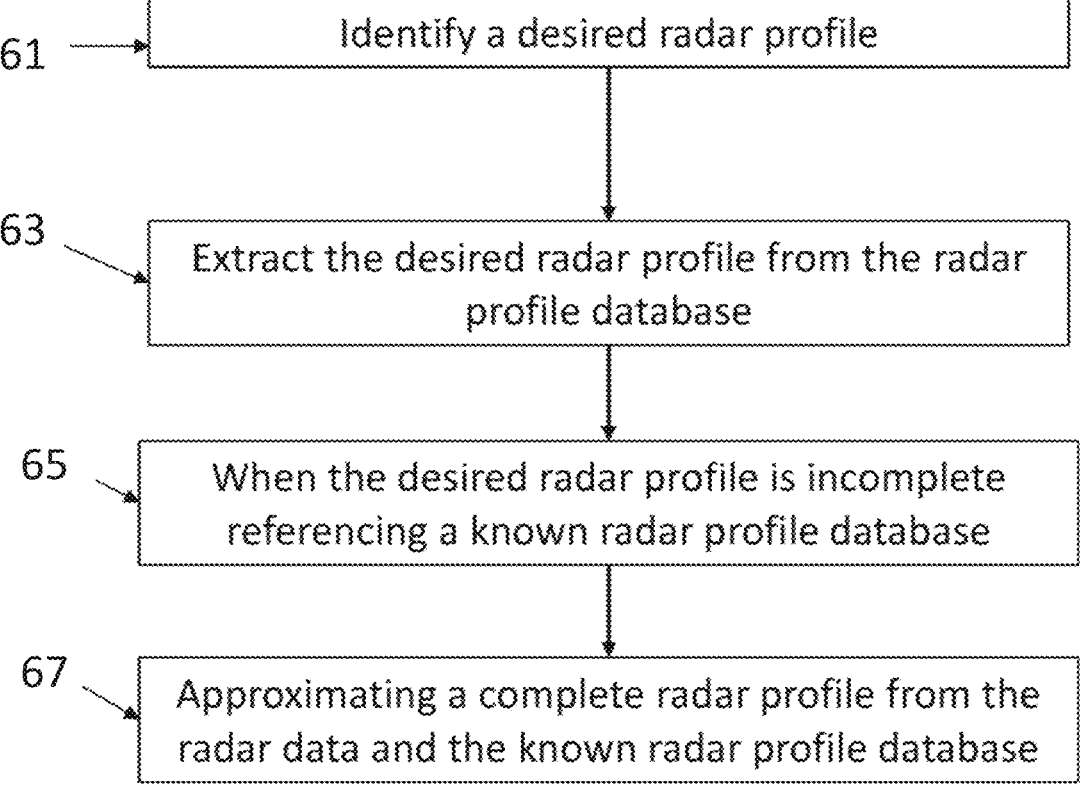
Figure 8:
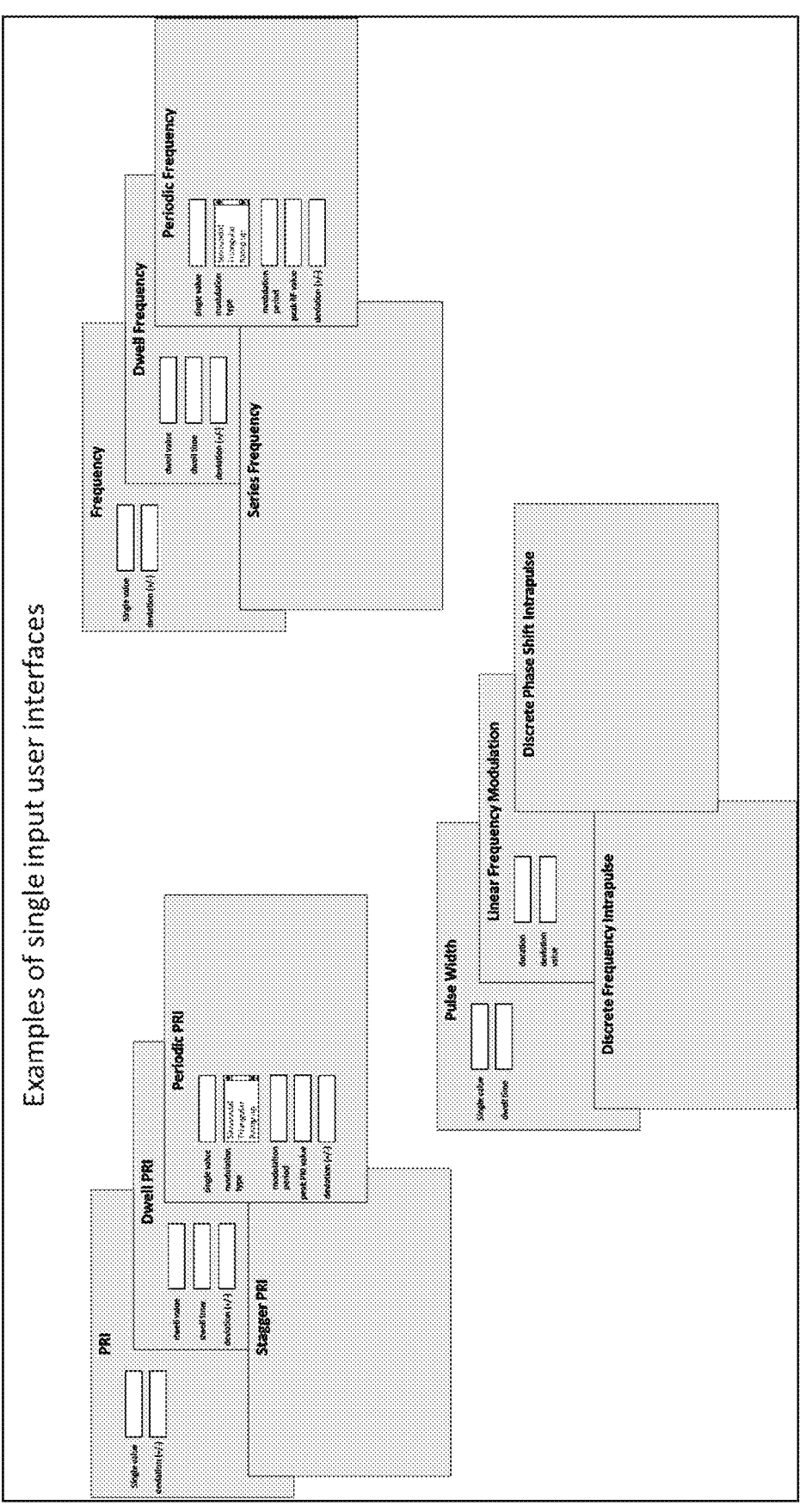
FIG. 8 is a sample of a single input user interface.

FIG. 7 further expands on method 1. In block 61, the method identifies a desired radar profile. The desired radar profile may be selected by human entry or by a computer system using a radar return. In block 63, the method extracts the desired radar profile from the radar profile database. In block 65, when the desired radar profile is incomplete referencing a known radar profile database. In block 67, the method approximates a complete radar profile from the radar data and the known radar profile database.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer-implemented method comprising:

acquiring raw data from at least one source;

extracting radar data from the raw data;

parsing a radar profile from the radar data; storing the radar profile;

converting the radar profile to a radio frequency (RF) waveform scenario file format; and creating an RF signal from the waveform scenario file format, wherein the extracting radar data further comprises:

identifying a plurality of key-value pairs that define the radar profile in the at least one source;

extracting the key-value pair;

determining the relationship between each of the key-value pairs; and extracting the key-value pairs.

2. The method of claim 1, wherein the at least one source may include at least one of a webpage, a table, a portable document format (PDF), a text file, a database, and an image.

3. The method of claim 1, wherein key-value pairs include at least one radio frequency waveform parameter, selected from the group consisting of radio frequency (RF), pulse width (PW), pulse repetition interval (PRI), and modulation characteristic (MC).

4. The method of claim 1, further comprising:

removing redundant data from the radar profile;

removing any unnecessary data;

renaming the key-value pairs to a common key-value pair names; and converting units to standard units.

5. The method of claim 1, further comprising:

transforming each of the key-value pairs to create the radio frequency (RF) waveform.

6. The method of claim 5, wherein the transforming a radio frequency (RF) key-value pair further comprises:

determining an RF type by identifying a RF keyword and/or value within the nested data structure;

when the RF type is single, extracting at least one frequency value and deviation value pair;

when the RF type is dwell, extracting at least one set of dwell value, dwell time, and deviation value;

when the RF type is periodic, extracting at least one set of a time duration, deviation value, modulation type, modulation period, and peak RF value; and when the RF type is a series, extracting a list of individual RF time elements and positions and a specific sequence for all the time elements.

7. The method of claim 5, wherein the transforming a Pulse Width (PW) key-value pair further comprises:

determining the PW type by identifying a PW specific keywords and/or values and/or data structure within the nested data structure;

extracting at least one pulse width value and a dwell time pair; and determining if intrapulse modulation exists and the modulation type for each pulse width dwell time pair;

when the intrapulse modulation type is a Linear Frequency Modulation (LFM), extracting a duration and a deviation value;

when the intrapulse modulation type is a discrete phase shift intrapulse, extracting a time duration, a deviation value, a modulation type, a modulation period, and a peak Pulse Repetition interval (PRI) value; and when the intrapulse modulation type is a discrete intrapulse, populating a list of individual PRI time elements and positions and a specific sequence for all the time elements.

8. The method of claim 5, wherein the transforming a Pulse Repetition Interval (PRI) key-value pair further comprises:

determining the PRI type by identifying PRI specific keywords and/or values and/or data structure within the nested data structure;

when the PRI type is single, extracting the interval value and deviation;

when the PRI type is dwell, extracting at least one set of a interval value, a dwell time, and a deviation value;

when the PRI type is periodic, extracting at least one set of an interval value, deviation value, modulation type, modulation period, and peak PRI value; and when the PRI type is stagger, extracting a list of individual PRI interval value and the deviation.

9. The method of claim 8, wherein the list of individual PRI for the stagger PRI type the order from the raw data is maintained.

10. The method of claim 3, further comprising:

identifying a desired radar profile;

extracting the desired radar profile from the radar profile database;

when the desired radar profile is incomplete referencing a known radar profile database;

approximating a complete radar profile from the radar data and the known radar profile database; and verifying that the radar profile is complete.

* * * * *